(12) United States Patent
Hsu

(10) Patent No.: US 6,304,435 B1
(45) Date of Patent: Oct. 16, 2001

(54) LAPTOP COMPUTER WITH FLAT PANEL SPEAKERS

(75) Inventor: Richard T. Hsu, Milpitas, CA (US)

(73) Assignee: Acer Incorporated, Taipei (TW)

( * ) Notice: Subject to any disclaimer, the term of this patent is extended or adjusted under 35 U.S.C. 154(b) by 0 days.

(21) Appl. No.: 09/190,627

(22) Filed: Nov. 12, 1998

(51) Int. Cl.⁷ .................................................. G06F 1/16
(52) U.S. Cl. ............................ 361/683; 361/681; 381/87; 345/905
(58) Field of Search ................................ 361/683, 681; 345/169, 905, 903; 312/223.1–223.6; 381/309, 87, 88; 364/708.1

(56) References Cited

U.S. PATENT DOCUMENTS

| 5,519,572 | 5/1996 | Luo | 361/685 |
| 5,552,957 | 9/1996 | Brown et al. | 361/683 |
| 5,583,743 | 12/1996 | Levins et al. | 361/683 |
| 5,604,663 | 2/1997 | Shin et al. | 361/686 |
| 5,638,456 | 6/1997 | Conley et al. | 381/190 |
| 5,646,820 | 7/1997 | Honda et al. | 361/683 |
| 5,666,263 | 9/1997 | Mundt et al. | 361/683 |
| 5,682,290 | 10/1997 | Markow et al. | 361/683 |
| 5,696,359 | 12/1997 | Marcus et al. | 181/199 |
| 5,768,163 | * 6/1998 | Smith, II | 361/683 |
| 5,838,537 | * 11/1998 | Lundgren et al. | 361/683 |
| 5,995,373 | * 11/1999 | Nagai | 361/755 |

FOREIGN PATENT DOCUMENTS

| WO 97/09852 | 3/1997 | (WO) . |
| WO 97/09853 | 3/1997 | (WO) . |
| WO 97/09854 | 3/1997 | (WO) . |
| WO 97/09858 | 3/1997 | (WO) . |
| WO 97/09859 | 3/1997 | (WO) . |
| WO 97/09861 | 3/1997 | (WO) . |

OTHER PUBLICATIONS

". . . Now For Our Nxt Trick" from website www.nxt.co.uk, indicated therein, as published in Club Mission Magazine, Dec. 1996.

* cited by examiner

Primary Examiner—Leo P. Picard
Assistant Examiner—Hung Van Duong
(74) Attorney, Agent, or Firm—Townsend and Townsend and Crew, LLP

(57) ABSTRACT

The present invention provides exemplary laptop computers having flat panel speakers. In one embodiment, a portable computer (10) is provided comprising a base (12) having a processor (14) and a lid assembly (16) hingedly connected to the base. The lid assembly has a front side (20) containing a display (24), and a back side (22), preferably having a recessed area (26). The computer includes at least one flat panel speaker assembly fixedly attached to the back side, preferably within the recessed area, and in electrical communication with the processor. In this manner, the flat panel speaker assembly is firmly attached to the lid assembly and does not need to be rotated or otherwise moved with respect to the lid assembly for exemplary audio quality.

9 Claims, 10 Drawing Sheets

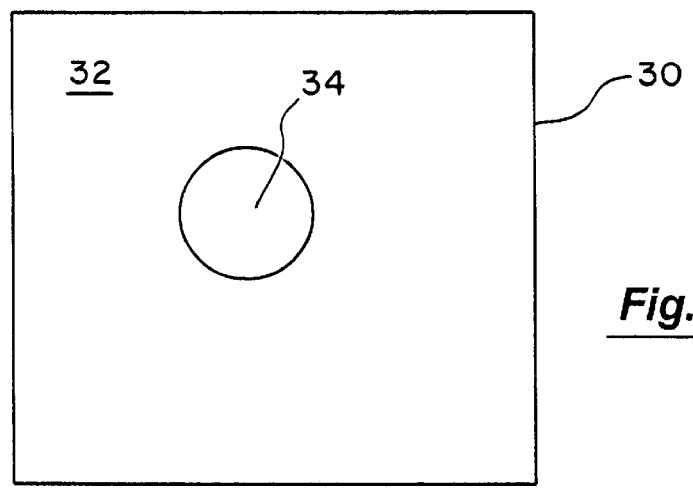
*Fig. 2A*
*Fig. 2B*
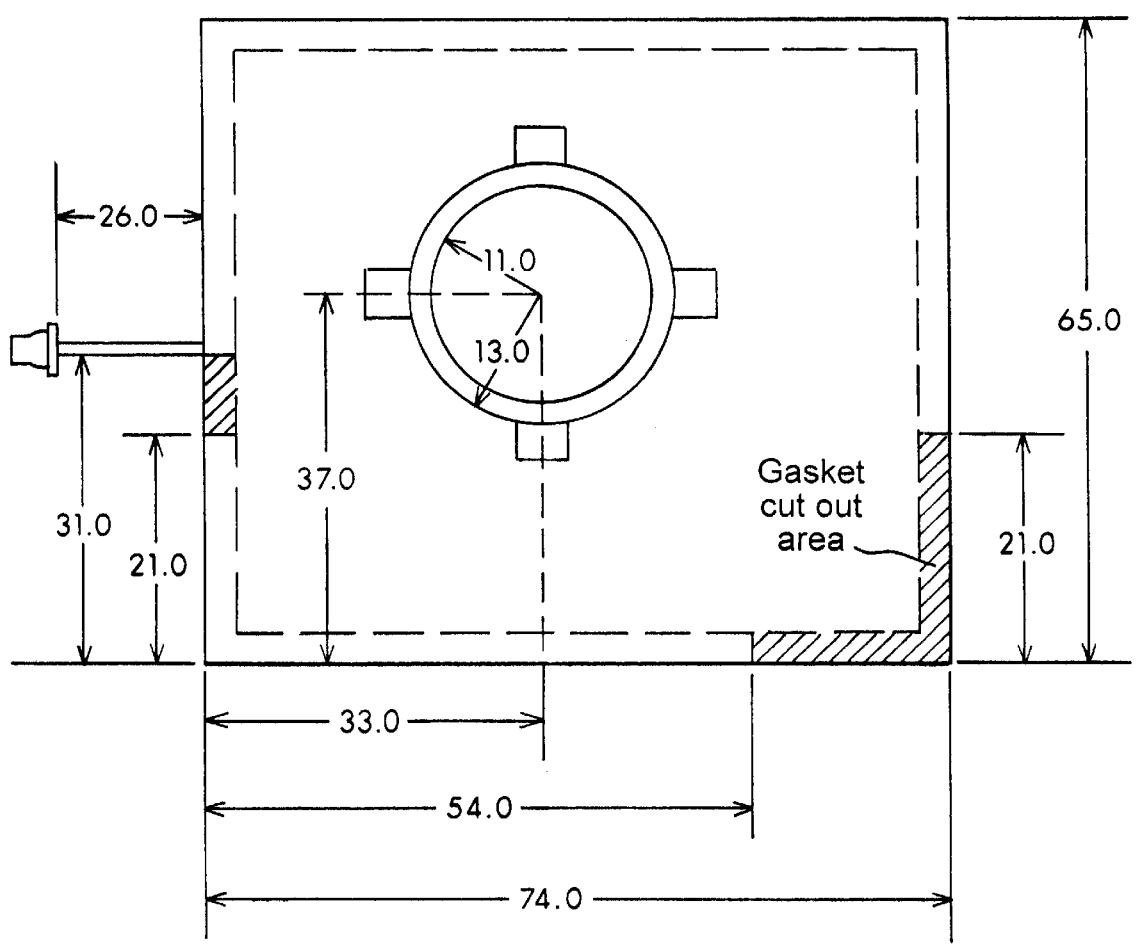

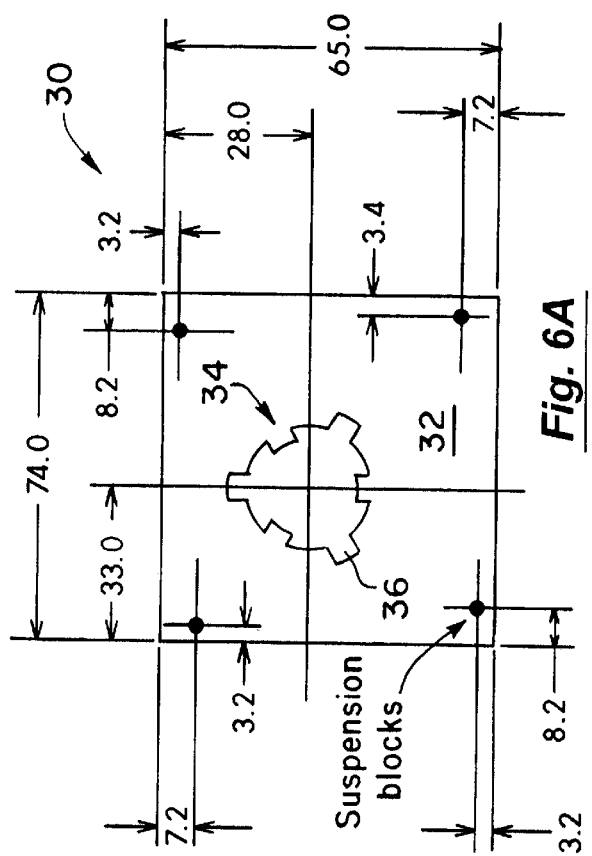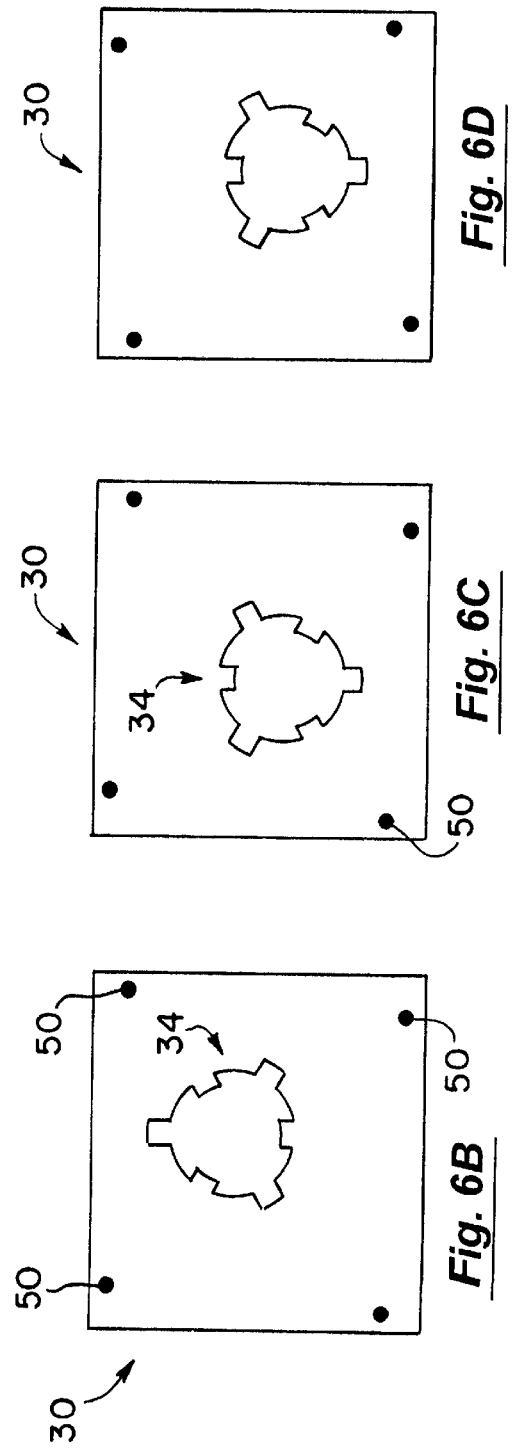

LAPTOP COMPUTER WITH FLAT PANEL SPEAKERS

BACKGROUND OF THE INVENTION

The present invention relates generally to laptop or portable computers and, more specifically, to laptop or portable computers having flat panel speakers.

Laptop computers traditionally have used fixed directional speakers located in the base of the laptop adjacent the keyboard. These speakers are subject to the typical limitations of piston-driven speakers. For example, off-axis sound quality decreases, and the sound volume decreases in accordance with the inverse square law. With the increased use of computers for multi-media applications, it is desirable to provide improved speakers and hence better sound quality for laptop computers.

Recent developments in flat panel speaker technology, particularly by New Transducer Ltd. (NXT) located in Stonehill, Huntingdon England, present the possibility of using flat panel speakers with laptop computers. For example, PCT Application No. PCT/GB96/02142 (Int'l. Pub. No. WO 97/09854) discloses a laptop computer using pull-out loud speakers. Such speakers, however, have several limitations which it would be desirable to avoid. Namely, it is desirable to provide fixed speakers capable of omni-directional audio output without having to move or rotate the speakers. Moving or rotating speakers presents the possibility of breakage of the hinges or speakers, particularly since it is common for laptop computers to be used in tight confines, such as in the coach section of airplanes.

SUMMARY OF THE INVENTION

The present invention provides exemplary laptop computers with flat panel speakers that overcome at least some of the shortcomings of the prior art. In one exemplary embodiment of the present invention, a portable computer is provided comprising a base having a processor. A lid assembly is hingedly connected to the base. The lid assembly has a front side containing a display, such as a liquid crystal display, and a back side. The computer includes at least one flat panel speaker assembly fixedly attached to the back side and in electrical communication with the processor. In this manner, the flat panel speaker assembly is firmly attached to the lid assembly and does not need to be rotated or otherwise moved with respect to the lid assembly for exemplary sound quality.

The flat panel speaker assemblies preferably reside in either a recessed area located within the back side or are fixedly attached to a cover covering the recessed area. An attachment mechanism fixedly attaches the speaker assemblies to a mounting surface on the back side of the lid assembly. In one aspect, the speaker assembly is mounted so that a flat panel of the speaker assembly is suspended above the mounting surface. In this manner, a gap is formed between the mounting surface and a portion of the flat panel speaker assembly to assist the production of high quality audio output.

Other features and advantages of the invention will appear from the following description in which the preferred embodiment has been set forth in detail in conjunction with the accompanying drawings.

BRIEF DESCRIPTION OF THE DRAWINGS

FIG. 2A and FIG. 2B depict front plan views of an exemplary flat panel speaker assembly;

FIGS. 6A–6D depict front plan views of the speaker assembly showing positioning of attachment points.

DESCRIPTION OF THE PREFERRED EMBODIMENT

Figure 1A:
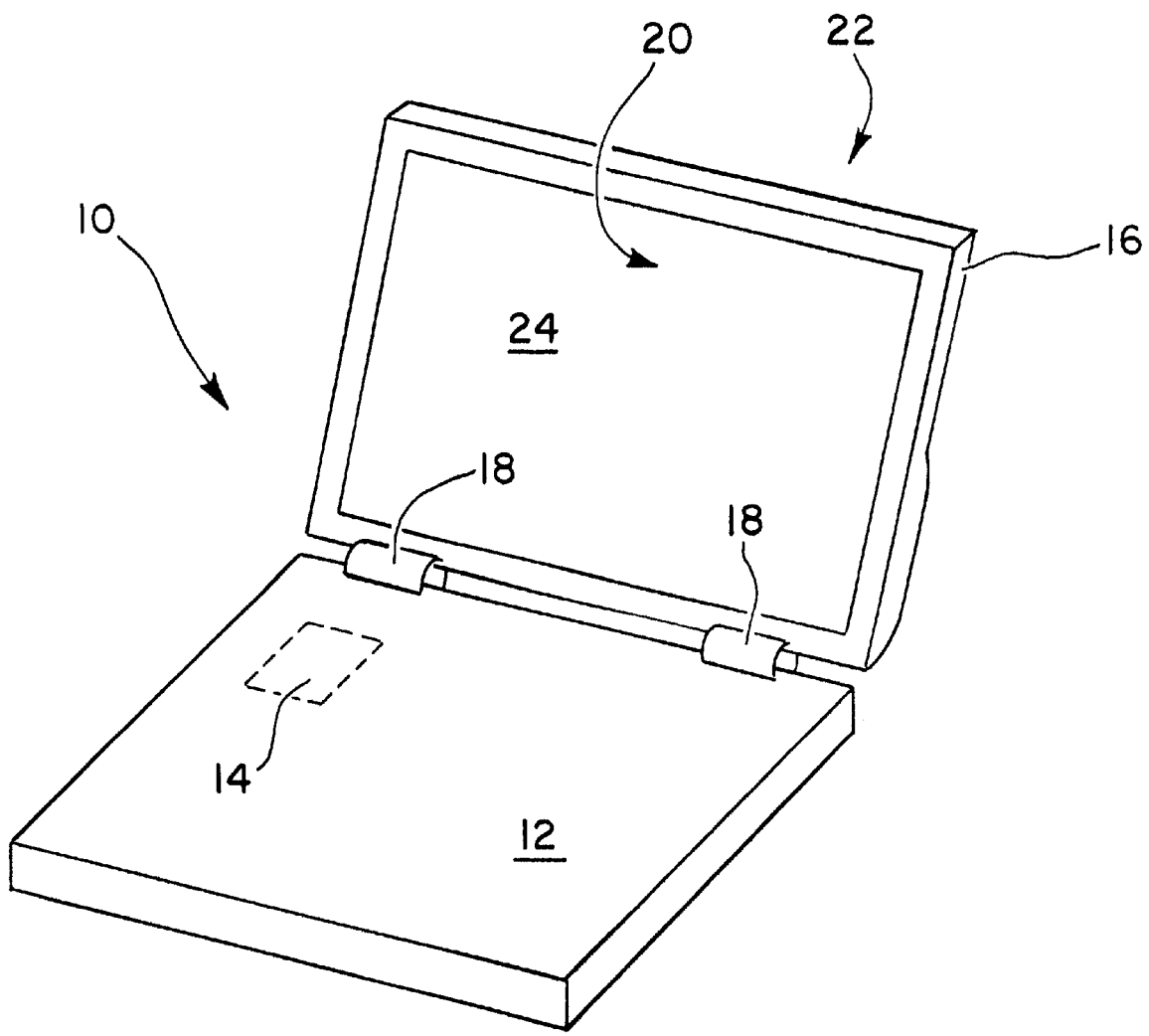
FIG. 1A depicts an overall view of a portable computer according to the present invention.
Figure 1B:
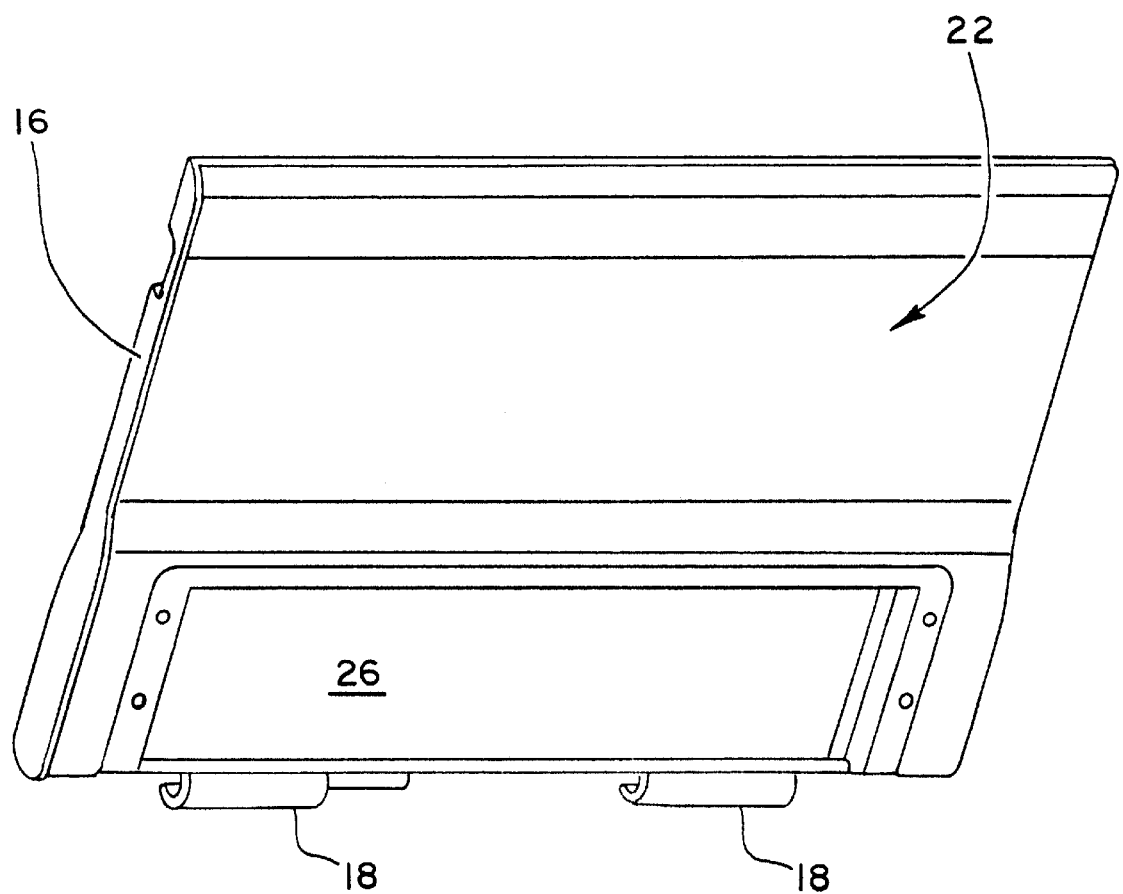
FIG. 1B depicts an overall view of the back side of a lid assembly of the portable computer shown in FIG. 1A.
Figure 1C:
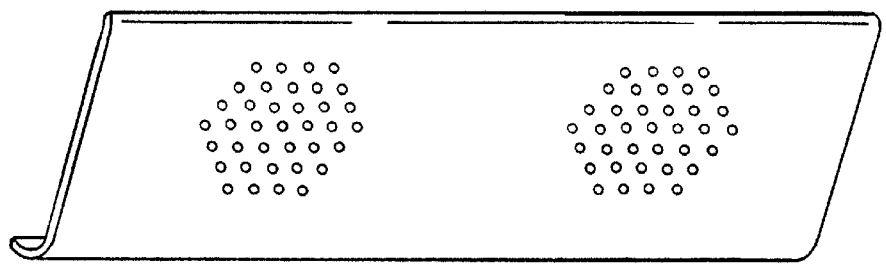
FIG. 1C depicts an overall view of a recessed area cover for use with the portable computer shown in FIGS. 1A–1B.

FIGS. 1A and 1B depict a portable computer 10 having a base 12 containing a processor 14. A lid assembly 16 is hingedly connected to base 12 using at least one hinge 18. Lid assembly 16 includes a display 24, such as a liquid crystal display, located on a front side 20 of lid assembly 16. Lid assembly 16 has a back side 22, as best shown in FIG. 1B, which includes a recessed area 26 therein. A recessed area cover 28, as shown in FIG. 1C, preferably encloses recessed area 26. Computer 10 includes at least one flat panel speaker assembly 30 fixedly attached to back side 22 as further described in conjunction with later figures.

Exemplary flat panel speakers for use with the present invention may be acquired from New Transducers Ltd. located in Stonehill, Huntingdon England and are further described in PCT Application Nos. PCT/GB96/02151 (Int'l. Pub. No. WO 97/09852), PCT/GB96/02167 (Int'l. Pub. No. WO 97/09859) and PCT/GB96/02160 (Int'l. Pub. No. WO 97/09861), the complete disclosures of which are herein incorporated by reference. At least part of the present invention is the recognition that flat panel speakers may be integrated into a laptop lid assembly to provide exemplary audio output for multi-media applications.

As shown in FIGS. 2A and 2E, speaker assembly 30 includes a panel 32, preferably comprising rohacell, carbon fiber, or the like. Speaker assembly 30 further has an exciter package 34 for producing vibrations within panel 32. Exciter package 34 is mounted wholly and exclusively on or in panel 32 at a predetermined location to launch bending waves into panel 32 to cause panel 32 to resonate to radiate an acoustic output. Exciter package 34 is driven by a signal amplifier, e.g., an audio amplifier, connected to the exciter package 34 by conductors (not shown). Exciter package 34 is then connected to processor 14 to receive audio commands. Exciter package 34 preferably is positioned slightly off center with respect to panel 32. In one particular embodiment, exciter package 34 is positioned as depicted in FIG. 2B on panel 32 having a surface area that is about 74 millimeters by about 65 millimeters. It will be appreciated by those skilled in the art that other panel 32 shapes and dimensions are possible within the scope of the present invention.

Figure 3A:
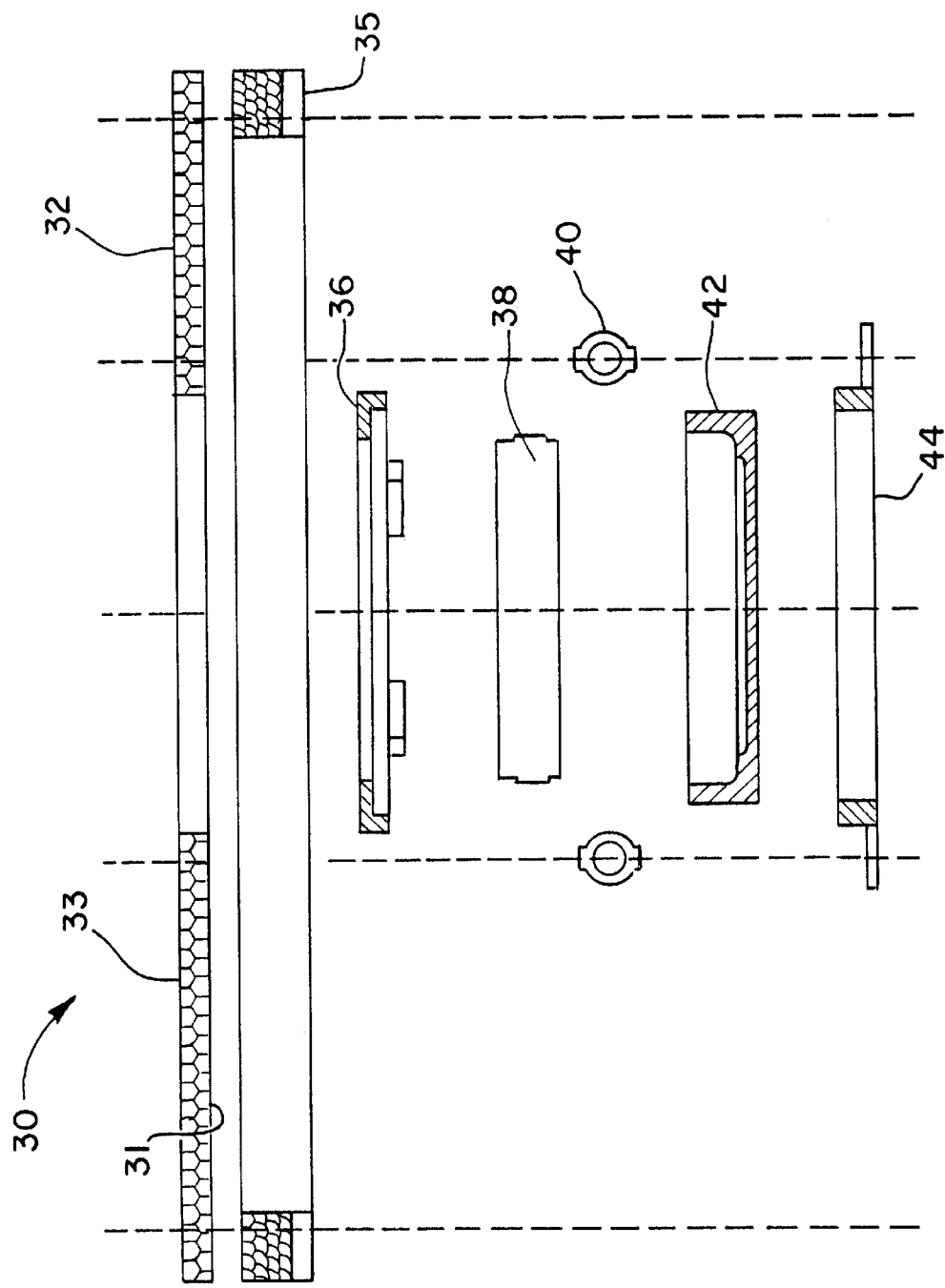
FIG. 3A and FIG. 3B depict an exploded side cross sectional view and a cross sectional view of the speaker assembly shown in FIG. 2, respectively.
Figure 3B:
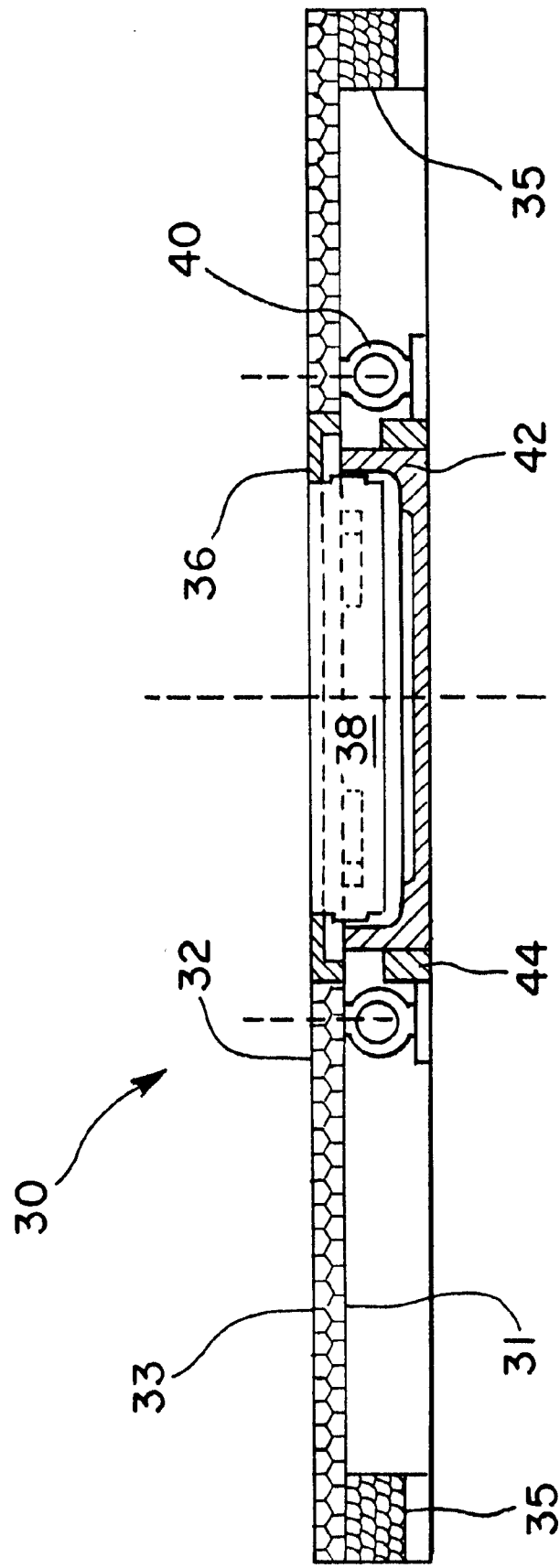

Speaker assembly 30 is further described in conjunction with FIGS. 3A and 3B which depict an exploded side cross sectional view and an assembled cross sectional view, respectively. Speaker assembly 30 includes panel 32, a suspension gasket 35 and a base 44. Exciter package 34 comprises a ring 36, a voice coil 38, and a cup 42. voice coil 38 is disposed within cup 42 and is held in place by ring 36. Voice coil 38 preferably comprises aluminum and cup 42 preferably comprises stainless steel, although other materials, including other metals, can be used for voice coil 38 and cup 42 within the scope of the present invention. Ring 36 preferably comprises plastic, nylon, ABS or the like, although other materials may be used within the scope of the present invention.

Speaker assembly 30 further includes suspension tubes 40 to operably attach base 44 to panel 32 while allowing panel 32 to vibrate in response to signals received from voice coil 38. Suspension gasket 35 and suspension tubes 40 preferably comprise rubber, foam rubber, foam plastic, elastomeric material or the like, although other materials may be used within the scope of the present invention.

Speaker assembly 30 is bi-directional. The sound energy from a back side 31 of panel 32 is not strongly phase related to that from a front side 33 of panel 32. Consequently there is the benefit of overall summation of acoustic power in the room, sound energy of uniform frequency distribution, reduced reflective and standing wave effects and with the advantage of superior reproduction of the natural space and ambience in the reproduced sound recordings.

While radiation from panel 32 is largely non-directional, the percentage of phase related information increases off axis. For improved focus for the phantom stereo image, placement of the speakers, like pictures, at the usual standing person height, confers the benefit of a moderate off-axis placement for the normally seated listener optimizing the stereo effect.

There is a further advantage for a group of listeners compared with conventional speaker reproduction. The intrinsically dispersed nature of panel 32 sound radiation gives it a sound volume which does not obey the inverse square law for distance for an equivalent point source. Because the intensity fall-off with distance is much less than predicted by inverse square law, then consequently for off-center and poorly placed listeners the intensity field for speaker assembly 30 promotes a superior stereo effect compared to conventional speakers. This is because the off-center placed listener does not suffer the doubled problem due to proximity to the nearer speaker, firstly the excessive increase in loudness from the nearer speaker, and then the corresponding decrease in loudness from the further speaker.

Figure 4A:
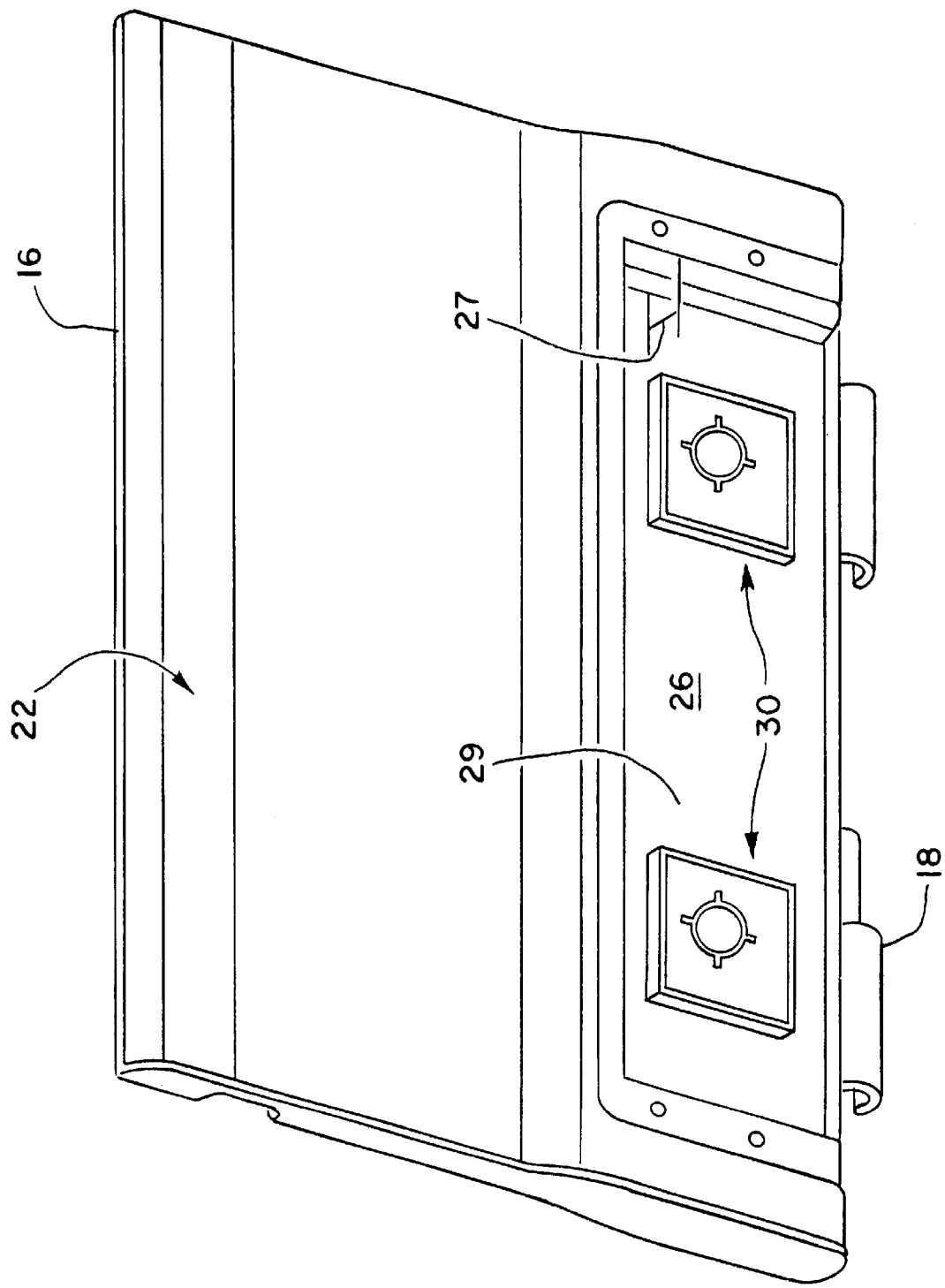
FIG. 4A depicts the back side of the lid assembly shown in FIG. 1B having flat panel speakers residing within the recessed area.
Figure 4B:
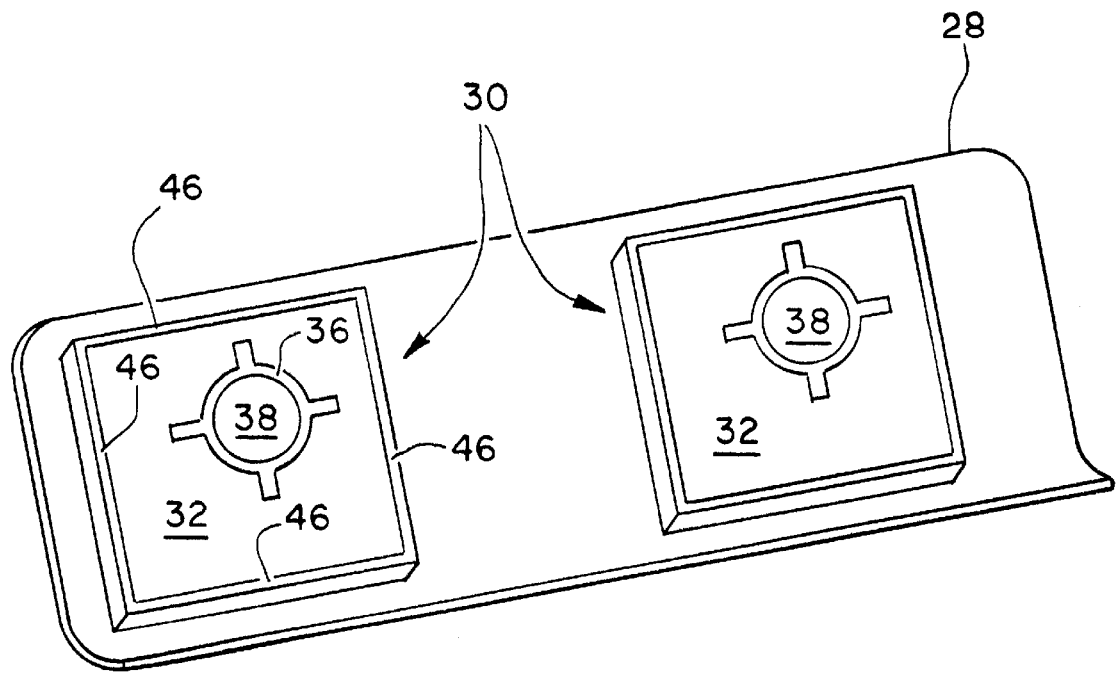
FIG. 4B depicts flat panel speaker assemblies attached to the recessed area cover according to the present invention.

Turning now to FIGS. 4A and 4B, attachment locations for fixedly attaching speaker assemblies 30 to lid assembly 16 shall be described. In one embodiment shown in FIG. 4A, speaker assemblies 30, preferably two assemblies 30, are fixedly attached to back side 22 of lid assembly 16 within recessed area 26. In one particular embodiment, recessed area 26 has a depth 27 that is preferably between about seven millimeters and about twelve millimeters. The size and depth 27 of recessed area 26 can vary within the scope of the present invention, and depth 27 typically depends in part upon the desired overall thickness of lid assembly 16. Such a recessed area size permits speaker assemblies 30 to be fully disposed within recessed area 26. Recessed area 26 then is covered with recessed area cover 28, such as a plastic or metal grid cover as depicted in FIG. 1C. Cover 28 operates to protect speaker assembly 30 from harmful contact and, to some extent, from dirt, dust and debris. Recessed area 26 operates as an acoustic chamber to resonate sound waves propagated by speaker assembly 30, thereby improving audio quality. At least one aspect of the present invention involves the recognition that disposing speaker assemblies 30 within recessed area 26 improves sound quality while further providing some degree of protection to speaker assemblies 30.

Alternatively, speaker assemblies 30 may reside within recessed area 26 by fixedly attaching speaker assemblies 30 to recessed area cover 28, as shown in FIG. 4B. Assemblies 30 are disposed within recessed area 26 when cover 28 is attached over recessed area 26. Similarly, cover 28 operates to enclose recessed area 26 and at least partially protect speaker assemblies 30.

Figure 5A:
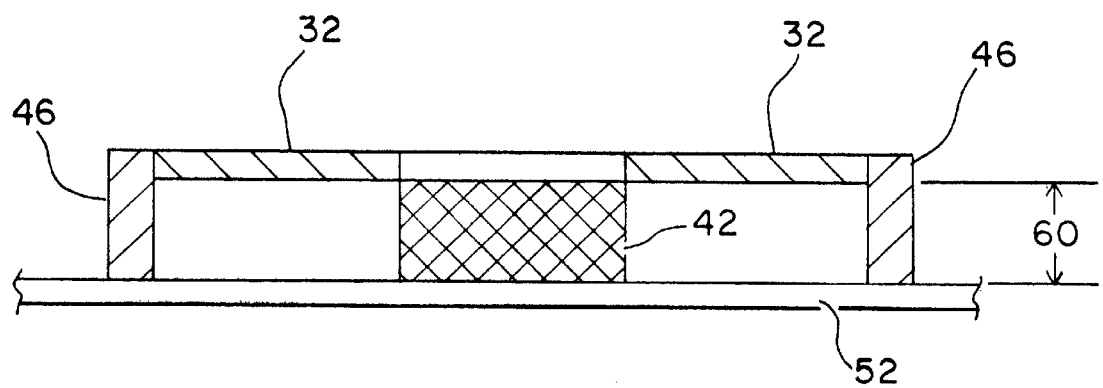
FIGS. 5A–5C depict alternative attachment mechanisms attaching the speaker assembly to a mounting surface.
Figure 5B:
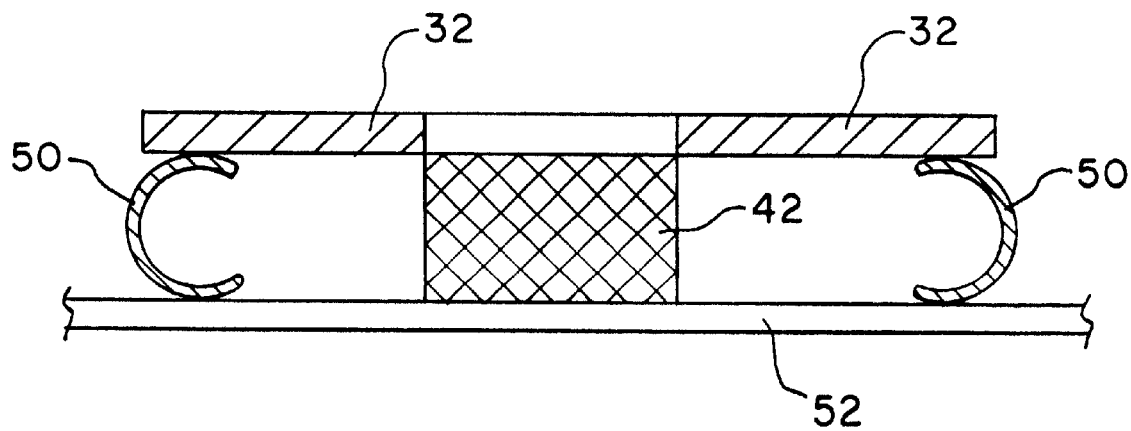
Figure 5C:
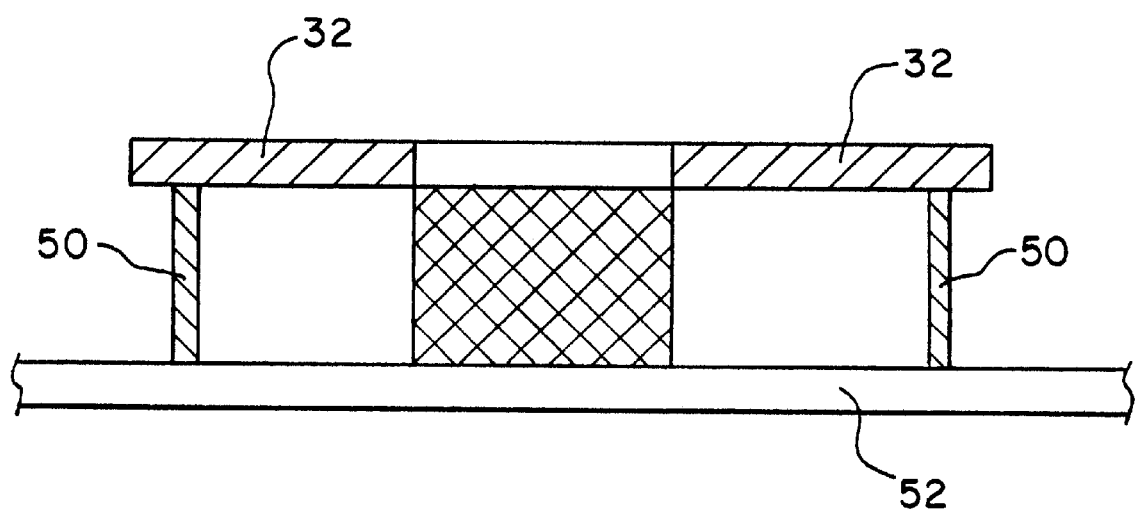

As shown in FIGS. 5A–5C, exemplary attachment mechanisms for attaching speaker assemblies 30 to a mounting surface 52 will be described. Mounting surface 52 preferably comprises the recessed area cover 28 (as shown in FIG. 4B) or a recessed area surface 29 (as shown in FIG. 4A). It will be appreciated by those skilled in the art that attachment mechanisms described in conjunction with a particular mounting surface also are applicable to other mounting surfaces.

Speaker assembly 30 preferably is affixed to mounting surface 52 in a manner which suspends panel 32 above mounting surface 52 a desired distance 60. Distance 60 preferably is between about 2.5 millimeters and about 12 millimeters. In one particular embodiment, distance 60 is about 2.5 millimeters, although this distance 60 can vary within the scope of the present invention. Suspending panel 32 above mounting surface 52 by distance 60 permits the radiation of acoustic energy from both sides of panel 32 as previously described.

Speaker assemblies 30 may be fixedly attached to mounting surface 52 in a variety of manners. For example, epoxy and the like may be used to operably attach cup 42 to mounting surface 52, thereby attaching speaker assembly 30 to mounting surface 52. In one preferred embodiment as shown in FIGS. 4A, 4B and 5A, four strips 46 are positioned along the periphery of panel 32. In this manner, panel 32 is attached about its periphery to strips 46, and strips 46 are in turn attached to mounting surface 52 to affix speaker assembly 30 thereto. Strips 46 may comprise, for example, four rubber strips, four epoxy strips, or some combination of rubber and epoxy strips. Strips 46 also may comprise foam rubber, foam plastic, elastomeric material and the like. The number of strips 46 also may vary within the scope of the present invention. For example, two strips 46 may be operably attached on opposing edges of panel 32 to affix speaker assembly 30 to mounting surface 52.

In lieu of strips 46, speaker assemblies 30 may be operably attached to mounting surface 52 in the manner depicted in FIGS. 5B or 5C. FIGS. 5B and 5C depict a plurality of suspension blocks 50 operably attached to panel 32 and mounting surface 52. In one particular embodiment shown in FIG. 5B, suspension blocks 50 comprise a generally semi-circular-shaped, resilient material, such as rubber, foam rubber, foam plastics and the like. In another embodiment, suspension blocks 50 may comprise generally post-shaped suspension blocks 50, as shown in FIG. 5C, comprising the same or similar materials. Alternatively, suspension blocks 50 may be square, rectangular, or a wide variety of shapes within the scope of the present invention. Suspension blocks 50 provide support to panel 32 while allowing panel 32 to randomly vibrate to produce exemplary audio output. Blocks 50 preferably are operably attached to surface 52 and panel 32 using epoxy or the like.

Positioning of suspension blocks 50 with respect to panel 32 is established to produce desired acoustic output from panel 32. As shown in FIGS. 6A–6D, exciter package 34, including outer plastic ring 36, is shown positioned slightly off-center with respect to panel 32. Suspension blocks 50 are configured about the periphery of panel 32 in desired locations as shown in FIGS. 6A–6D. Such a configuration facilitates the desired acoustic output and the desired distributed mode sound radiation effects of panel 32.

Figure 7:
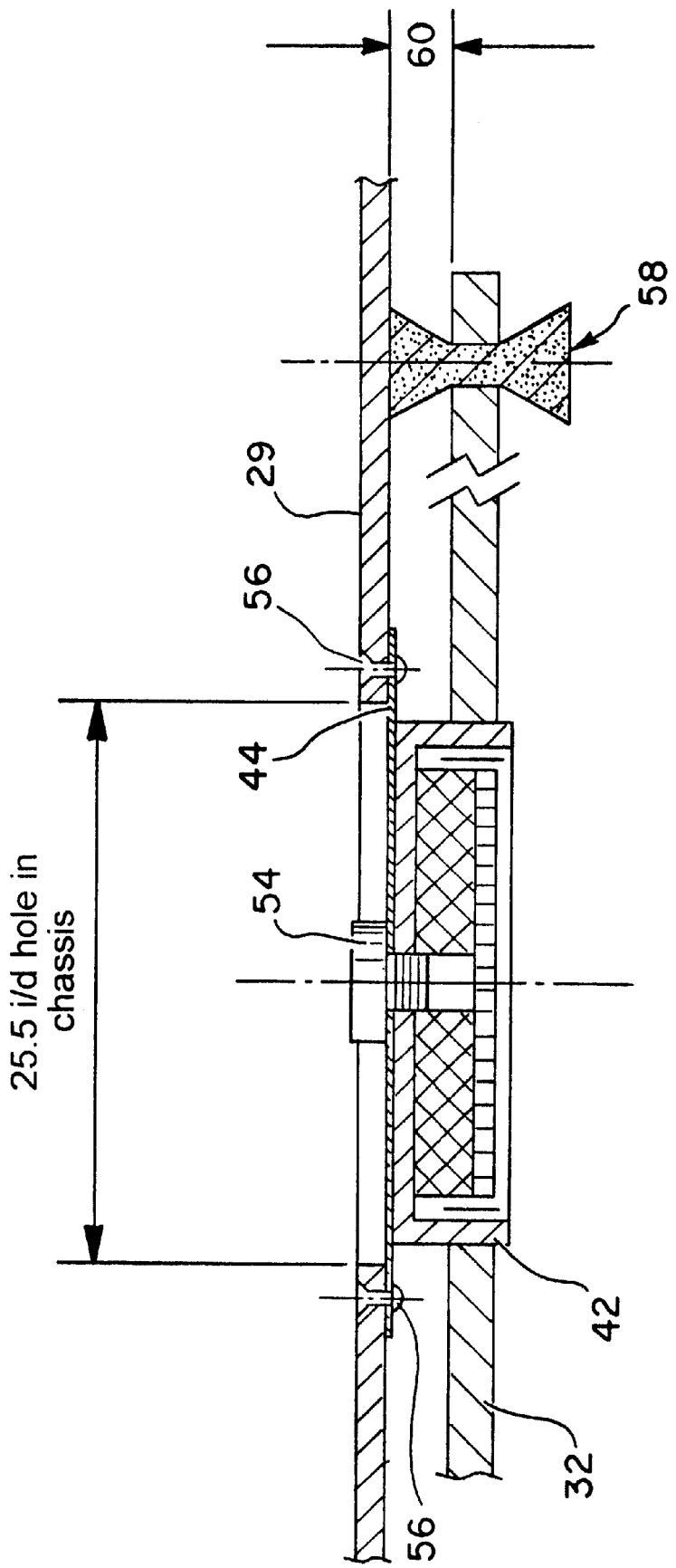
FIG. 7 depicts an alternative embodiment of a speaker assembly attachment mechanism for use with the present invention.

In conjunction with FIG. 7, an alternative attachment mechanism will be described. In one embodiment, speaker assembly 30 is fixedly attached to recessed area 26, and more specifically, to recessed area surface 29 using a retaining member 54. Retaining member 54 may comprise a bolt, a screw, a rivet or the like. As shown in FIG. 7, at least two rivets 56 are used to attach base 44 of speaker assembly 30 to surface 29. Retaining member 54 fixedly attaches cup 42 to surface 29 in a manner which suspends panel 32 distance 60 from surface 29. In addition, a plurality of foam pads 58, and more preferably four foam pads 58, are positioned generally about the periphery of panel 32. Foam pads 58 operate to control panel 32 vibration in a similar fashion as the suspension blocks 50 described in FIG. 6. Such a configuration suspends panel 32 from surface 29 the desired distance to help produce exemplary audio output. Foam pads 58 further provide some measure of protective buffering against the recessed area cover 28 in the event cover 28 is compressed inward.

The invention has now been described in detail. However, it will be appreciated that certain changes and modifications may be made. Therefore, the scope and content of this invention are not limited by the foregoing description. Rather, the scope and content are to be defined by the following claims.

What is claimed is:

1. A portable computer comprising:
   a base comprising a processor;
   a lid assembly hingedly connected to said base, said lid assembly having a front side containing a display and a back side having a recessed area; and
   at least one flat panel speaker assembly fixedly attached to said back side in electrical communication with the processor and fully disposed within said recessed area so as to not be visible from said front side.

2. A portable computer as in claim 1, wherein said lid assembly further comprises a cover for covering said flat panel speaker and said recessed area.

3. A portable computer as in claim 1, wherein said back side includes a mounting surface, said speaker assembly being fixedly attached to said back side to position said flexible panel a desired distance from said mounting surface.

4. A portable computer as in claim 1, further comprising at least two spaced apart speaker assemblies fixedly attached to said back side.

5. A portable computer as in claim 1, wherein said recessed area comprises an acoustic chamber.

6. A portable computer as in claim 3, wherein said flat panel speaker further comprises a suspension block operably attached to a speaker flexible panel and said mounting surface.

7. A portable computer comprising:
   a base;
   a lid assembly hingedly connected to said base, said lid assembly having a front side and a back side, said front side having a display and said back side having a recessed area;
   a cover operably attached to said lid assembly to cover said recessed area; and
   at least one flat panel speaker assembly attached to said cover and received within said recessed area when said cover is attached to said lid assembly;
   wherein said flat panel speaker assembly is not visible from said front side when said cover is attached to said lid assembly.

8. A portable computer as in claim 7, further comprising at least two spaced apart speaker assemblies fixedly attached to said cover.

9. A portable computer as in claim 7, wherein said flat panel speaker further comprises a flexible panel, an exciter package positioned slightly off-center with respect to said flexible panel, and a suspension block operably attached to said flexible panel and said cover.

* * * * *